UNITED STATES PATENT OFFICE.

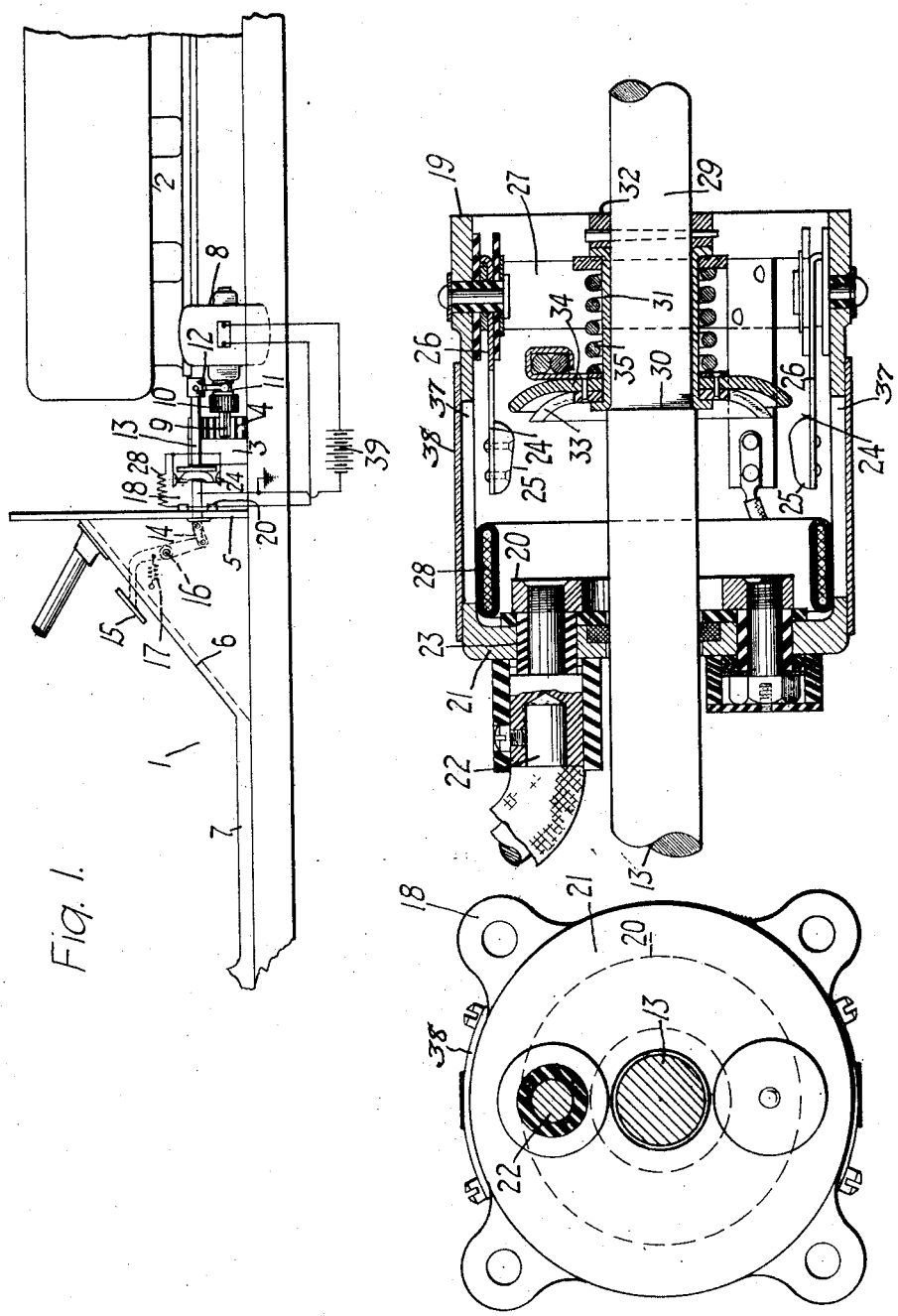

CHESTER B. MILLS, OF EAST McKEESPORT, AND CHARLES E. WILSON, OF WILKINS-BURG, PENNSYLVANIA, ASSIGNORS TO WESTINGHOUSE ELECTRIC AND MANUFACTURING COMPANY, A CORPORATION OF PENNSYLVANIA.

STARTING SYSTEM FOR AUTOMOBILES.

1,352,468.  Specification of Letters Patent.  Patented Sept. 14, 1920.

Application filed July 29, 1913. Serial No. 781,763.

*To all whom it may concern:*

Be it known that we, CHESTER B. MILLS and CHARLES E. WILSON, citizens of the United States, and residents, respectively, of East McKeesport and Wilkinsburg, both in the county of Allegheny and State of Pennsylvania, have invented a new and useful Improvement in Starting Systems for Automobiles, of which the following is a specification.

Our invention relates to starting systems for automobiles, and it has particular reference to such systems as embody motors and gear mechanisms for connecting the motors to the gas engines of automobiles.

The object of our invention is to provide a simple structure which insures that the gear wheels for connecting the starting motor to the engine shaft shall be easily meshed.

It has been the practice, to a large extent, in systems of the above indicated character, to employ a small high-speed motor which is connected to the engine shaft by reduction-gear mechanism. The engine fly wheel is ordinarily utilized as the gear wheel on the engine shaft.

In attempting to mesh the connecting gear wheel with the fly wheel gear teeth, difficulty is often encountered because the teeth of the respective gear wheels are not properly in register.

We propose to avoid the above difficulty by starting the motor slowly and then allowing it to rotate by its inertia alone while the gears are being meshed and, in this manner, to insure that the teeth will be in the proper relative positions for meshing.

The details of our invention will be described in connection with the accompanying drawings in which Figure 1 is a side view, in elevation, of a portion of an automobile with our invention applied thereto, the electrical circuits and certain of the apparatus being shown diagrammatically. Fig. 2 is a view, in longitudinal section, of an electrical switch which forms a portion of our invention. Fig. 3 is an end view of the switch shown in Fig. 2.

The automobile 1 is provided with the usual gas engine 2 which has a fly wheel 3 provided with peripheral gear teeth 4. The body of the vehicle comprises a dashboard 5, a foot board 6, and a floor 7, the remainder of the vehicle structure being broken away for the sake of clearness. An electric motor 8, supported in any suitable manner, has an armature shaft 9 on which a pinion 10 is mounted to slide into and out of mesh with the fly wheel gear teeth 4. The pinion 10 is provided with an integral grooved collar 11 to be engaged by a yoke member 12 fixed on a shift rod 13. The shift rod 13 extends through a suitable opening in the dashboard 5 and is connected by a link 14 to a pedal 15 which has a pivotal support at 16. A spring 17, which is connected to the pedal 15 and to the foot board 6, normally holds the shift rod in its forward position, with the pinion 10 disengaged from the fly wheel gear teeth 4.

A switch 18 may be attached to the dashboard in the position shown diagrammatically in Fig. 1. The switch is shown in detail in Fig. 2 and comprises an outer casing 19 that may be of cast or pressed material and substantially cylindrical in shape. An annular stationary contact member 20 is mounted upon the inner surface of the end 21 of the casing and is provided with a terminal 22 which extends through an insulated opening 23 in the end 21. Two contact clips 24, comprising contact pieces 25 and resilient supporting arms 26, are attached to and insulated from the casing 19. The clips are connected by a conductor 27 which is connected to the contact member 20 through a resistor 28. The movable portion of the switch comprises a reciprocable rod—in this case, the shift rod 13—which is provided with a reduced portion 29 and a shoulder 30.

A cylindrical sleeve 31 is mounted upon the reduced portion 29 and is retained between the shoulder 30 and a fixed collar 32. Two cupped disks 33 and 34, having diameters of unequal length, are slidably mounted on the sleeve 31 and are normally held against a flange 36 of the sleeve 31 by a stiff coil spring 35. The disks 33 and 34, which form the movable contact members of the switch, are grounded to the rod 13 or, if preferred, they may be connected directly in circuit by the usual conductors. The casing 19 is provided with openings 37 which are covered with removable caps 38 to permit of inspection and repair of the switch mechanism.

In the operation of the switch, the disk 34 engages the contact pieces 25, and the circuit is closed through the resistor 28. Further reciprocation of the rod 13 breaks this connection and, at the end of the movement, the disk 33 is tightly pressed against the contact member 20. The slidable mounting of the contact disks 33 and 34 permits movement of the rod 13 after the disk 33 has engaged the contact member 20. This construction insures that the spring 35 will be compressed to cause a good contact between the disk 33 and the contact member 20.

When it is desired to start the engine, the operator presses the pedal 15 to shift the rod 13, the contact disks 33 and 34 and the pinion 10 backwardly. A slight movement causes the disk 34 to engage the contact clips 24 and thereby complete a circuit from the ungrounded terminal of a storage battery 39 through the motor windings, the contact member 20, resistor 28, contact clips 24 and rod 13 to ground. The motor is rotated slowly, because the resistor 28 is in circuit therewith. The further reciprocation of the rod 13 breaks the motor circuit, and the motor rotates because of its inertia only. The pinion 10 can then be meshed easily with the gear teeth 4 because the slow rotation of the pinion insures that the teeth will register properly. Also, since the torque on the motor is very slight, there will be little or no friction between the respective gear teeth. The disk 33 engages the contact member 20 when the pinion is fully meshed and completes the running circuit of the motor which is the same as that above traced except that the resistor 28 is cut out. When the engine starts under its power, the operator releases the pedal, and the spring 17 restores the various parts to their respective inoperative positions.

While we have described our invention in its preferred form, it is understood that such changes may be made as fall within the limits of the appended claims.

We claim as our invention:

1. The combination with an engine shaft, a motor, and gear wheels for operatively connecting said motor to said engine shaft, of means for successively supplying power to said motor to cause it to rotate slowly, disconnecting said motor from the source of power, effecting the engagement of said gear wheels and causing said motor to rotate at normal speed.

2. The combination with two gear wheels, one of which is slidable into and out of mesh with the other, of means for successively applying power to the slidable gear wheel, interrupting the supply of power, shifting said slidable gear into mesh with the other gear wheel, and again applying power to said slidable gear wheel when the gear wheels are fully meshed.

3. The combination with an engine shaft, a gear wheel connected thereto, and an electric motor having a shaft and a gear wheel connected to said motor shaft, of means for successively connecting a resistor in circuit with said motor, opening the motor circuit, effecting the meshing of said gear wheels, and closing the motor circuit.

4. The combination with an engine shaft, a gear wheel connected thereto, a motor having a shaft, and a slidably mounted gear wheel connected to the motor shaft, of means for successively applying power to said motor, interrupting the supply of power, shifting said slidable gear into mesh with the other gear wheel, and again applying power to said motor.

5. The combination with an engine shaft, a gear wheel connected to said engine shaft, a motor having a shaft, and a slidably mounted gear wheel connected to said motor shaft, of means for applying power temporarily to said motor and then effecting the engagement of said gear wheels while the motor is rotating because of its inertia alone.

6. The combination with an engine shaft, a gear wheel connected thereto, a motor having a shaft, and a slidably mounted gear wheel connected to said motor shaft, of means for shifting said slidable gear wheel into mesh with the other gear wheel, and means connected to said shifting means for controlling said motor, whereby the motor is caused to rotate slowly by its inertia alone while the gear wheels are being meshed.

7. A motor controller comprising a power controller and load connecting means, said controller and said means being interlocked to insure cessation of power during operation of said load connecting means but permitting operation of said controller to supply power prior to and after setting of said connecting means.

8. A motor controller comprising a power controller operable to successively establish, interrupt and reëstablish power connections, and load connecting means interlocked with said controller to operate in the interval between the interruption and reëstablishment of the power connections by said controller, said controller upon initial operation restricting the power supplied to the motor.

9. In a motor controller, in combination, a power controller, load connecting means, and a common operating member therefor movable to successively establish and interrupt the power connections, operate said means and then reëstablish power connections.

10. In a controller for electric motors, in combination, a resistance, a controller operable to successively connect the motor in circuit through said resistance, disconnect the motor from circuit and reëstablish the motor circuit with said resistance excluded, and load connecting means associated with said controller to be operable only in the interval between the disconnection of the motor from circuit and the reëstablishment of the motor circuit.

11. The method of starting an engine, comprising accelerating a motor, decelerating the same, engaging the same with the engine, accelerating the motor, and disengaging the motor from the engine.

In testimony whereof, we have hereunto subscribed our names this 21st day of July 1913.

CHESTER B. MILLS.
CHAS. E. WILSON.

Witnesses:
JOHN P. NIKONOW,
B. B. HINES.